Patented Mar. 8, 1938

2,110,838

UNITED STATES PATENT OFFICE 2,110,838

HYDROLYSIS OF ISOPROPYL CHLORIDE

Edgar C. Britton, Gerald H. Coleman, and Garnett V. Moore, Midland, Mich., assignors to The Dow Chemical Company, Midland, Mich., a corporation of Michigan No Drawing. Application February 28, 1936, Serial No. 66,218

8 Claims. (Cl. 260—156)

This invention concerns an improved method of hydrolyzing isopropyl chloride to produce isopropyl alcohol. It particularly concerns the selective hydrolysis of isopropyl chloride in admixture with normal propyl chloride and the production of substantially pure isopropyl alcohol and normal propyl chloride thereby.

In chlorinating propane in vapor phase by known methods a mixture of isomeric mono-chloro-propanes is obtained, which tend to distill together, so that separation of the same by distillation is difficult. An object of the present invention is to provide a method whereby the isopropyl chloride in such mixture may be selectively hydrolyzed to form isopropyl alcohol, which may be readily separated from the normal propyl chloride to obtain both compounds in pure form. Other objects will be apparent from the following description of the invention.

It is known that isopropyl chloride can be hydrolyzed by heating the same with water, but such procedure is disadvantageous from a viewpoint of commercial manufacture, in that a hydrochloric acid solution which is highly corrosive to iron equipment is formed. Insofar as we are aware, isopropyl chloride has not heretofore been hydrolyzed by reaction with an aqueous alkali solution nor has the selective hydrolysis of isopropyl chloride in the presence of normal propyl chloride been carried out. Indeed, there was reason to suppose that such selective hydrolysis could not be accomplished, since Slator et al., J. C. S. 95, 95 (1909), Haywood, J. C. S. 121, 1904 (1922), and Conant et al., J. A. C. S. 47, 477 (1925) have shown that in a number of reactions involving propyl halides, a normal propyl halide is more reactive than the corresponding isopropyl halide.

We have now found that isopropyl chloride may be readily reacted with an aqueous alkali solution, but that the principal product of such reaction may be either propylene or isopropyl alcohol, depending on the conditions under which the hydrolysis is carried out. For instance, we have found that the employment of strong alkalis and reaction temperatures above 130° C. cause the formation of propylene in considerable yield, but that when isopropyl alcohol is the product desired, the reaction can be carried out most efficiently at temperatures below 130° C., using as a hydrolyzing agent an alkali, such as calcium hydroxide, which is only sparingly soluble in water. We have also observed that the hydrolysis occurs more rapidly when such sparingly soluble alkali is employed than when a strong soluble alkali, such as sodium hydroxide, is used under otherwise similar reaction conditions.

We have further discovered that isopropyl chloride reacts more readily and rapidly with an aqueous alkali than does normal propyl chloride and that the difference in reactivity of the isomeric propyl chlorides varies when different alkalis are employed in the reaction, being particularly pronounced when the alkali is one which is only sparingly soluble in water. On the basis of the above discoveries our improved method has been developed, whereby (1) isopropyl chloride may be hydrolyzed in usual iron or other metal equipment to produce isopropyl alcohol in good yield without danger of corroding such equipment, and (2) the hydrolysis may be carried out in selective manner using a mixture of iso- and normal-propyl chlorides as the beginning material to produce substantially pure isopropyl alcohol and normal propyl chloride as principal products. The invention, then, consists in the method hereinafter fully described and particularly pointed out in the claims.

The selective hydrolysis of isopropyl chloride in the presence of normal propyl chloride is accomplished by heating a mixture of said chlorides, such as is obtained by direct chlorination of propane, with water and an alkali such as calcium hydroxide, calcium carbonate, barium hydroxide, barium carbonate, magnesium hydroxide, ferrous hydroxide, ferric hydroxide, etc., which is only sparingly soluble in water, the reaction being carried out in a closed reactor, advantageously with stirring, at a temperature between 70° and 125° C., preferably between 80° and 110° C. Approximately one chemical equivalent of the alkali, e. g. 0.5 mole of calcium hydroxide, is preferably employed per mole of isopropyl chloride, but a larger or smaller proportion of alkali can be used if desired. The proportion of water in the reaction mixture may be varied widely, but within limits we have found that an increase in the proportion of water employed results in an increase in rate of hydrolysis and a decrease in by-product formation. Since the cost of handling large quantities of water and of recovering the alcohol product from very dilute solutions places a practical limit on the amount of water to be used, we ordinarily employ between 2 and 15 parts by weight of water per part of isopropyl chloride.

During the above heating operation samples of the reaction mixture may be withdrawn from time to time and analyzed for inorganic chlorides. Heating is preferably discontinued when the inorganic chloride, e. g. calcium chloride, formed by the reaction is chemically equivalent to the isopropyl chloride initially employed. Longer heating may result in hydrolysis of the normal propyl chloride, particularly when the alkali reactant has been employed in a proportion exceeding the chemical equivalent of the isopropyl chloride. The autoclave is then cooled, any propylene formed by the reaction is released therefrom and collected, and the residual mixture is fractionally distilled to separate the normal propyl chloride and isopropyl alcohol products. In the distillation the normal propyl chloride distills first and can be obtained directly in nearly pure form, after which the isopropyl alcohol distills together with some water and is collected as an aqueous solution thereof containing about 85-88 per cent by weight of alcohol. If desired, the aqueous alcohol product may be dehydrated by usual procedure, e. g. by distillation over quick lime.

The hydrolysis of isopropyl chloride alone may be carried out using a sparingly soluble alkali at temperatures below 130° C., as described above, but may also be carried out at considerably higher temperatures, e. g. 200° C. or above, although the proportion of isopropyl chloride converted to propylene by the treatment is somewhat greater at the higher reaction temperatures.

The following examples illustrate various ways in which the principle of the invention has been applied, but are not to be construed as limiting the invention.

*Example 1*

A mixture of 1 gram mole of isopropyl chloride, 1 gram mole of normal propyl chloride, 0.51 gram mole of calcium hydroxide, and 37.5 gram moles of water was heated to 90° C. in a rotating iron bomb for 23 hours. The bomb was then cooled, a small quantity of propylene formed by the reaction was released and collected, and the main body of reaction mixture was fractionally distilled to separate the normal propyl chloride and isopropyl alcohol products. The aqueous alcohol fraction of the distillate was treated with potassium carbonate to form alcoholic and aqueous layers, and the alcoholic layer was separated and redistilled to obtain the pure alcohol. Some isopropyl ether was separated during the last mentioned distillation. There was obtained 0.06 gram mole of propylene, 0.04 gram mole of isopropyl ether, 0.94 gram mole of normal propyl chloride, and 0.90 gram mole of pure isopropyl alcohol, the yields of normal propyl chloride and isopropyl alcohol being 94 per cent and 90 per cent of theoretical, respectively. No normal propyl alcohol was obtained.

*Example 2*

A mixture of 1 gram mole of isopropyl chloride, 1 gram mole of normal propyl chloride, 0.51 gram mole of ferrous hydroxide (formed by mixing ferrous sulphate with its chemical equivalent of sodium hydroxide) and 75 gram moles of water was heated to 90° C. in an iron bomb with agitation for 10 hrs. The products were then separated as in Example 1. There was obtained, 0.07 mole of propylene, 0.07 mole of isopropyl ether, 0.97 mole of normal propyl chloride, and 0.81 mole of pure isopropyl alcohol. No normal propyl alcohol was obtained.

Other modes of applying the principle of our invention may be employed instead of those explained, change being made as regards the method herein disclosed, provided the step or steps stated by any of the following claims or the equivalent of such stated step or steps be employed.

We therefore particularly point out and distinctly claim as our invention:—

1. The method which comprises reacting isopropyl chloride with a mixture of water and an alkali which is sparingly soluble in water, to form isopropyl alcohol.

2. The method which comprises reacting isopropyl chloride with an aqueous alkaline earth metal hydroxide to form isopropyl alcohol.

3. The method which comprises heating a mixture of isopropyl chloride, water, and calcium hydroxide at superatmospheric pressure to a temperature between 70° and 130° C.

4. The method which comprises reacting isopropyl chloride, in admixture with normal propyl chloride, with an aqueous suspension of an alkali which is sparingly soluble in water, and thereafter separating isopropyl alcohol and normal propyl chloride from the reacted mixture.

5. The method which comprises heating a mixture of isopropyl chloride, normal propyl chloride, water, and an alkali which is sparingly soluble in water, at superatmospheric pressure to a reaction temperature between about 70° and about 130° C.

6. The method which comprises heating to a reaction temperature between about 80° and about 110° C. at superatmospheric pressure and with agitation a mixture of isopropyl chloride, normal propyl chloride, water, and an alkali which is sparingly soluble in water, said alkali being employed in a proportion representing approximately the chemical equivalent of the isopropyl chloride, and thereafter separating isopropyl alcohol and normal propyl chloride from the mixture.

7. The method which comprises heating a mixture of isopropyl chloride and normal propyl chloride in a closed reactor to a temperature between about 80° and about 110° C. with water and an alkaline earth metal hydroxide, the latter being employed in a proportion representing approximately the chemical equivalent of the isopropyl chloride, and thereafter separating isopropyl alcohol and normal propyl chloride from the reaction mixture.

8. The method which comprises heating a mixture of isopropyl chloride and normal propyl chloride with water and calcium hydroxide to a temperature between about 80° and about 110° C. in a closed reactor, the alkali being employed in a proportion approximately chemically equivalent to the isopropyl chloride, and thereafter distilling the reacted mixture to separate isopropyl alcohol and relatively pure normal propyl chloride therefrom.

EDGAR C. BRITTON.
GERALD H. COLEMAN.
GARNETT V. MOORE.